United States Patent Office 3,706,793
Patented Dec. 19, 1972

3,706,793
RECOVERY OF POLYHYDRIC ALKANOLS AND METAL SALTS OF ALKANOIC ACIDS
Roy H. Prinz, Robstown, Tex., assignor to Celanese Corporation, New York, N.Y.
No Drawing. Filed Jan. 28, 1971, Ser. No. 110,640
Int. Cl. C07c 29/26, 51/44
U.S. Cl. 260—542                                           9 Claims

ABSTRACT OF THE DISCLOSURE

Alkali or alkaline earth metal salts and polyhydric alcohols are recovered from aqueous solution by first mixing with the aqueous solution an organic solvent composed of acetone and a $C_1$ to $C_3$ alkanol so as to precipitate the metal salt. The polyhydric alcohol is then recovered from the mother liquor by crystallization after removal of the organic solvent by distillation.

BACKGROUND OF THE INVENTION

Polymethylol polyhydric alcohols such as pentaerythritol are generally made by reacting formaldehyde with a higher aldehyde in the presence of an alkaline condensing agent such as an alkali metal or alkaline earth metal hydroxide. Illustrative of the most widely used type of process for production of pentaerythritol is U.S. Patent 2,790,836 issued to Mitchell and Pritchett, which patent discloses the production of pentaerythritol from formaldehyde and acetaldehyde employing sodium hydroxide as a catalyst. Other catalysts such as barium hydroxide, potassium hydroxide, sodium carbonate and magnesium oxide have also been suggested as catalysts for such reactions. Likewise substitution of propionaldehyde for the acetaldehyde will result in production of trimethylolethane, substitution of butyraldehyde for the acetaldehyde will result in the production of trimethylolpropane, etc. In the production of pentaerythritol itself such compounds as beta-hydroxypropionaldehyde, acrolein, acetaldol and paraldehyde may be used in the place of the acetaldehyde and paraformaldehyde used instead of formaldehyde.

In most of the foregoing type of processes as well as in many others, there results a large waste stream which is an aqueous solution containing dissolved therein both the polyhydric alcohol being produced as well as a metal salt of a carboxylic acid, the latter resulting from a reaction between the alkaline condensing agent and an aldehyde present. Most often the metal salt is a formate. These large waste streams are usually sewered even though there are large amounts of valuable polyhydric alcohol and metal salt therein because no efficient methods have been developed for recovery of the polyhydric alcohol which avoid contamination of the product with an excessive amount of the metal salt.

SUMMARY OF THE INVENTION

It is thus an object of the present invention to provide a process for recovering polyhydric alcohols and metal salts from aqueous solutions containing same. It is a particular object of the present invention to provide a process for recovering pentaerythritol and sodium formate from an aqueous solution contained dissolved therein both of such compounds. It is a further object of the present invention to provide an organic solvent suitable for effecting the precipitation of a metal salt from an aqueous solution containing dissolved therein said metal salt and a polyhydric alcohol. Additional objects will become apparent from the following description of the present invention.

These and other objects are accomplished by the present invention which in one of its aspects is a process for treating an aqueous solution containing dissolved therein both a saturated $C_5$ to $C_{10}$ polyhydric alcohol having at least three methylol groups and an alkali or alkaline earth metal salt of a carboxylic acid so as to recover said metal salt and said polyhydric alcohol, said process comprising the successive steps of: (a) Precipitating said metal salt from solution by mixing with said aqueous solution in organic solvent comprising a mixture of acetone and a $C_1$ to $C_3$ monohydric alkanol; (b) isolating the thus precipitated metal salt from the remaining liquid; (c) removing from said remaining liquid of step (b) above essentially all of the organic solvent contained therein so as to result in a second aqueous solution containing said polyhydric alcohol dissolved therein; and (d) treating said second aqueous solution resulting from step (c) so as to crystallize polyhydric alcohol therefrom and recovering the thus crystallized polyhydric alcohol.

DETAILED DESCRIPTION OF THE INVENTION

The streams to be treated in accordance with the present invention are those aqueous solutions containing both a metal salt and a polymethylol polyhydric alcohol dissolved therein. The invention finds its most use in treating streams originating from those processes wherein the polyhydric alcohol was produced with formaldehyde as a reactant and a metal hydroxide as a catalyst. The process may be utilized to recover polyhydric alcohols and metal salts from aqueous solution practically regardless of the concentration of the solution or the ratio of the metal salt to polyhydric alcohol. Generally speaking, however, the more favorable results will be obtained when the aqueous solution contains from about 55 to 80 weight percent water, 3 to 15 weight percent polyhydric alcohol and 15 to 35 weight percent metal salt, the total percentage of course being 100 percent. Most advantageously the present invention is applied to aqueous solutions containing 65 to 80 weight percent water, 4 to 9 percent polyhydric alcohol and 20 to 30 percent metal salt. In addition to the water, polyhydric alcohol and metal salt present there may also be present other compounds in small amounts, preferably less than two percent by weight, without affecting the process. In fact there will almost always be small amounts of these other compounds such as dipentaerythritol, formals, formose sugars, aldol resins present in those streams to which the invention is most applicable, that is those derived from a process wherein the polyhydric alcohol is produced and recovered by crystallization. Thus the aqueous solution could be the mother liquor from one or more of such crystallizations or be derived from such mother liquors.

The recovery of saturated polyhydric alcohols of 5 to 10 carbon atoms having at least three methylol groups, and preferably acyclic, may be effected by the present process although the process can be utilized for the recovery of other polyhydric alcohols as well. By the term "methylol group" is meant the radical —$CH_2OH$. In addition to the recovery of pentaerythritol for which the present invention is especially suited, particular polyhydric alcohols which may be recovered are dipentaerythritol, 2 - hydroxymethyl - 2-methyl-1,3 propanediol also know as trimethylolethane, 2-ethyl-2-hydroxymethyl-1,3-propanediol also known as trimethylolpropane, and 2,2,4,4-hydroxymethyl-3 hydroxy-1,5 pentanediol, the common name of the latter being heptitol.

The metal salt that may be recovered using the present invention will be in general an alkali or alkaline earth metal salt of a carboxylic acid, most often the salt being of formic acid such that the salt is a formate. Salts of other carboxylic acids may, however, be recovered with best results being obtained when the carboxylic acid is a lower alkanoic acid of 1 to 6 carbon atoms such as formic, acetic, propionic, butyric and caproic. These alkanoic acids are of the generic formula $C_nH_{2n}O_2$. The metal portion of the metal salt will as stated be an alkali metal such as sodium, potassium or lithium or an alkaline earth metal such as calcium, barium, strontium or magnesium. The present invention is especially suitable to recover those salts of the alkali and alkaline earth metals having atomic numbers of 11 through 20, inclusive, that is, sodium, potassium, calcium and magnesium, the invention being most suitable to recover sodium salts.

The first step of the invention is causing the metal formate to precipitate as a solid from solution thus leaving the polyhydric alcohol in the mother liquor. This is accomplished by adding a particular organic solvent to the aqueous solution which causes the metal salt to precipitate as readily filterable needles. The organic solvent utilized is the heart of the invention and comprises a mixture of from about 15 to 80 volume percent acetone and 20 to 85 volume percent of a $C_1$ to $C_3$ monohydric alkanol. Ethanol gives superior results over the other alkanols, with methanol being the second choice and isopropyl or n-propyl being least desirable. Also when ethanol is being used superior results are obtained when the organic solvent mixture contains about 65 to 85 volume percent ethanol, the remaining 15% to 35% being acetone. With methanol best results are obtained when the organic solvent mixture contains from about 20 to 60 volume percent methanol, the 30 to 50 volume percent range being especially preferred.

In order to effect a maximum precipitation of the metal salt the volume of organic solvent added to the aqueous solution of polyhydric alcohol and metal salt should be at least four parts for each one volume of aqueous solution; for example, 4 to 20 parts. Preferably 4 to 12 volumes of organic solvent are utilized per volume of aqueous solution. The volume of organic solvent added will depend somewhat on the concentration of the metal salt, less organic solvent being required as the amount of metal salt present increases.

The temperature at which the aqueous solution and the organic solvent are mixed may be ordinary temperatures; for example, within the range of about 0° C. to 100° C. but preferably within the range of 20° C. to 80° C. Although the temperature can be above the normal boiling point of the mixture such is economically unfeasible as it would require the use of super-atmospheric pressures to maintain a liquid phase. The pressure needs only to be sufficient to maintain a liquid phase and may be sub-atmospheric, atmospheric or super-atmospheric.

After the metal salt is caused to be precipitated from solution, the salt can be easily recovered by any of the known methods for separating solids and liquids such as by filtration, centrifugation or the like. The salt generally precipitates in a needle form which is easily isolated by filtration. The mother liquor remaining after separation of the precipitate therefrom will be a single phase solution containing the water, the polyhydric alcohol, the organic solvent and any remaining metal salt which did not precipitate upon addition of the organic solvent. This mother liquor will next be processed to recover the polyhydric alcohol therefrom by first treating the mother liquor so as to remove the organic solvent such as by distillation. Although the removal of the organic solvent is preferably accomplished by standard distillation techniques, it can be accomplished by any other suitable technique.

Upon removal of the organic solvent, which may be recycled if desired, there will be remaining an aqueous solution contained dissolved therein the polyhydric alcohol as well as any portion of the metal salt which was not precipitated in the first step of the process. The major part of the polyhydric alcohol may then be recovered from this aqueous solution by crystallization techniques. Even though as pointed out above there is some metal salt left in the aqueous solution at this point, the salt does not crystallize with the polyhydric alcohol and, therefore, a high purity polyhydric alcohol may be recovered in the crystallization. Any of the standard techniques may be used to effect crystallization and such crystallization may be effected by cooling without evaporation such as in a cooling crystallizer, or by evaporation without cooling as in a crystallizing evaporator, or accomplished using a combination of both evaporation and cooling such as through use of a vacuum crystallizer. Preferably the crystallization step is accomplished with both cooling and evaporation or removal of at least a portion of the water, for example from 20 to 80 percent of the water. Upon crystallization of the polyhydric alcohol it may easily be recovered by filtration, centrifugation and the like.

The following examples illustrate specific embodiments of the present invention.

Example I

An experiment was conducted in order to recover the sodium formate and pentaerythritol from an aqueous solution thereof, the aqueous solution being a waste stream from a process for the production of pentaerythritol by reacting acetaldehyde and formaldehyde in the presence of a sodium hydroxide condensation agent. The aqueous solution contained by weight about 28% sodium formate, 4.5% pentaerythritol, 0.7% dipentaerythritol, 0.06% tripentaerythritol and 0.06% linear formals. 500 milliliters of the aqueous solution were poured into 3000 milliliters of a 25 vol. percent acetone-75 vol. percent ethanol mixture with stirring at 25° C. After standing for 10 minutes the precipitated sodium formate was recovered by filtration through a No. 4 Whatman filter paper using a Buchner funnel. The salt was vacuum dried at 100° C. for 40 minutes and weighed. 95 grams of sodium formate were recovered. This represented 60% of the sodium formate in the aqueous solution feed material. The filtrate was distilled on a 30-tray Oldershaw column at a 3:1 reflux ratio to recover the solvent. The residue (450 milliliters) was then evaporated under vacuum to 200 milliliters and allowed to cool and crystallize. After one hour the pentaerythritol crystals were filtered with a Buchner funnel and washed with 200 milliters ice water, followed by an acetone wash to dry the crystals. The pentaerythritol crystals were then air dried at room temperature for 30 minutes and weighed. 16.1 grams or about 72% of the pentaerythritol were recovered.

Analysis of the sodium formate recovered showed it to have a pH in a 10% aqueous solution of 7.6 and a melting range of 254–257° C. as compared to a literature value of 253° C. Analysis of the pentaerythritol recovered showed it to contain 91.7 wt. percent pentaerythritol, 6.3 wt. percent dipentaerythritol, less than 0.01 wt. percent tripentaerythritol, 2.02 wt. percent linear formal and less than 0.05 wt. percent sodium formate.

Example II

Several runs were made in order to determine the effect of varying the alkanol-acetone ratio on the recovery of the sodium formate from the waste stream described in Example I. All variables except the ratio of alkanol to acetone in the organic solvent were held constant in each of the runs in order that it could be determined which alkanol-acetone ratio effected maximum precipitation of the sodium formate. Runs were made using both methanol and ethanol. In each run one part by volume (100 ml.) of the aqueous solution consisting of the waste stream was added to each 5 parts by volume (500 ml.) of the organic solvent with mixing at room temperature. After standing for ten minutes the resulting sodium formate precipitate was recovered by filtration through a Buchner funnel, dried and weighed. Table I following gives the results of each of the runs.

TABLE I

| Run No. | Alkanol | Percent of— Alkanol in solvent¹ | Percent of— Sodium formate recovered |
|---|---|---|---|
| 1 | Ethanol | 100 | 31 |
| 2 | do | 85 | 39 |
| 3 | do | 80 | 47 |
| 4 | do | 75 | 53 |
| 5 | do | 70 | 44 |
| 6 | do | 65 | 43 |
| 7 | Methanol | 100 | 5 |
| 8 | do | 50 | 40 |
| 9 | do | 40 | 44 |
| 10 | do | 30 | 43 |
| 11 | do | 20 | 31 |

¹ Remainder of solvent being acetone.

Example III

Several runs were made in order to determine the effect of varying the volume of organic solvent used to cause the precipitation of the sodium formate from the waste stream described in Example I. In each of the runs all variables were held constant except that the amount of solvent added to the aqueous solution of sodium formate and pentaerythritol was varied. Runs using both an ethanol-containing organic solvent and a methanol-containing organic solvent were made, the former containing 3 volumes of ethanol per volume of acetone and the latter containing 1 volume methanol per 2 volumes of acetone. In each run about 100 milliliters of the aqueous solution was added to an amount of organic solvent such that the ratio of organic solvent to aqueous solution was as indicated in Table II. The addition of organic solvent was accomplished with mixing and at about 25° C. After standing for ten minutes the sodium formate precipitate was removed by filtration through a Buchner funnel, dried and weighed. Table II following gives the results of each of the runs.

TABLE II

| Run No. | Volume ratio, solvent:aqueous solution | Alkanol utilized | Percent sodium formate recovered |
|---|---|---|---|
| 1 | 4:1 | Ethanol | 43 |
| 2 | 5:1 | do | 54 |
| 3 | 6:1 | do | 61 |
| 4 | 8:1 | do | 59 |
| 5 | 10:1 | do | 57 |
| 6 | 11:1 | do | 56 |
| 7 | 4:1 | Methanol | 22 |
| 8 | 6:1 | do | 45 |
| 9 | 8:1 | do | 49 |
| 10 | 10:1 | do | 48 |

What is claimed is:

1. A process for recovering an alkali or alkaline earth metal salt of a lower alkanoic acid and a polyhydric alkanol having at least three methylol groups from an aqueous solution thereof containing 55–80 weight percent water, said solution being obtained by the condensation of aldehydes in the presence of an alkaline condensing agent, said process comprising the successive steps of:

(a) Precipitating said metal salt from solution by mixing with said aqueous solution from 4 to 12 parts by volume of an organic solvent consisting essentially of a mixture of 15 to 80 volume percent acetone and 20-85 volume percent of a $C_1$ to $C_3$ monohydric alkanol for each one part by volume of said aqueous solution, (b) isolating the thus precipitated metal salt from the remaining liquid, (c) removing from said remaining liquid of step (b) above by distillation essentially all of the organic solvent contained therein so as to result in a second aqueous solution containing said polyhydric alkanol dissolved therein, and (d) treating said second aqueous solution resulting from step (c) so as to crystallize polyhydric alkanol therefrom and recovering the thus crystallized polyhydric alkanol.

2. The process of claim 1 wherein said polyhydric alcohol is pentaerythritol.

3. The process of claim 2 wherein said metal salt is sodium formate.

4. The process of claim 2 wherein said alkanoic acid is a saturated $C_1$ to $C_3$ alkanoic acid and said metal has an atomic number within the range of 11 through 20 inclusive.

5. The process of claim 2 wherein said monohydric alkanol is ethanol.

6. The process of claim 2 wherein said organic solvent consists essentially of from about 15 to 35 volume percent of acetone and 65 to 85 volume percent of ethanol.

7. The process of claim 2 wherein step (a) thereof is conducted at tempeartures within the range of about 20 to 80 degrees C.

8. The process of claim 2 wherein said aqueous solution contains by weight from about 55 to 80 percent water, 3 to 15 percent pentaerythritol, and 15 to 35 percent sodium formate, said aqueous solution having been derived from a process wherein pentaerythritol is produced by reacting acetaldehyde and formaldehyde in the presence of a sodium hydroxide catalyst and recovered by crystallization.

9. A process for recovering sodium formate and pentaerythritol from an aqueous solution containing from about 4 to 9 weight percent of pentaerythritol, from about 65 to 80 weight percent water, and from about 20 to 30 weight percent of sodium formate, said aqueous solution being derived from a process wherein pentaerythritol is produced by reacting acetaldehyde and formaldehyde in the presence of sodium hydroxide and recovered by crystallization, said process comprising the successive steps of (a) precipitating said sodium formate from solution by adding and mixing with each volume of said aqueous solution from 4 to 12 volumes of an organic solvent consisting essentially of 15 to 35 volume percent acetone and 65 to 85 volume percent ethanol, the temperature being maintained within the range of about 20 to 80 degrees C. and the pressure sufficient to maintain a liquid phase, (b) isolating the thus precipitated, solid sodium formate from the remaining liquid, (c) removing from said remaining liquid of step (b) essentially all of said organic solvent contained therein by distillation so as to obtain a second aqueous solution containing pentaerythritol dissolved therein, and (d) treating said second aqueous solution obtained in step (c) so as to crystallize pentaerythritol therefrom and recovering the thus crystallized pentaerythritol.

References Cited

UNITED STATES PATENTS

| 2,441,602 | 5/1948 | Snow et al. | 260—637 P |
| 2,468,718 | 4/1949 | Wyler | 260—637 P |
| 2,782,918 | 2/1957 | Cristoffel | 260—542 |
| 3,076,854 | 2/1963 | Klein | 260—637 P |
| 3,096,377 | 7/1963 | Roche et al. | 260—637 P |

VIVIAN GARNER, Primary Examiner

U.S. Cl. X.R.

260—540, 541, 635 P, 637 P